United States Patent [19]

Walker et al.

[11] Patent Number: 5,048,743
[45] Date of Patent: Sep. 17, 1991

[54] ROTOR BLADE BONDING DEVICE

[75] Inventors: Raymond M. Walker, Port St. Lucie; John T. Sinski, Tequesta, both of Fla.

[73] Assignee: United Technologies Corporation, Hartford, Conn.

[21] Appl. No.: 516,017

[22] Filed: Apr. 26, 1990

[51] Int. Cl.$^5$ ............................................. B23K 37/00
[52] U.S. Cl. ................................... 228/44.3; 228/119; 29/402.13; 29/889.1; 219/161
[58] Field of Search ............... 228/44.3, 119; 219/161; 29/402.13, 889.7, 889.1

[56] References Cited

U.S. PATENT DOCUMENTS

| | | | |
|---|---|---|---|
| 4,243,169 | 1/1981 | Sara | 228/175 |
| 4,252,263 | 2/1981 | Houston | 228/193 |
| 4,864,706 | 9/1989 | Jenkel | 29/156.8 B |
| 4,873,751 | 10/1989 | Walker et al. | 29/156.8 B |
| 4,883,216 | 11/1989 | Patsfall | 228/119 |
| 4,934,583 | 6/1990 | Patsfall | 228/44.3 |

Primary Examiner—Richard K. Seidel
Assistant Examiner—Timothy M. Boynton
Attorney, Agent, or Firm—Edward L. Kochey, Jr.

[57] ABSTRACT

A blade bonding device permits individual blades to be bonded to a blade stub for the purpose of replacing a damaged blade. The device includes a clamp frame and hydraulic ram. A blade holder arranged in contact with the axially moveable ram shaft is guided by a precision slot and pin arrangement from the frame. The clamp engages the inner surfaces of the rim of the rotor disk, and has a cooling passage through this location near the rim. The advantages of the clamp and cooling means are to not mechanically or thermally stress the disk.

4 Claims, 2 Drawing Sheets

ROTOR BLADE BONDING DEVICE

TECHNICAL FIELD

The invention relates to bonding blades to an integrally bladed rotor and in particular to a fixture for performing said bonding.

BACKGROUND ART

Gas turbine engines are widely used and well developed generators of power used primarily for aircraft propulsion. An overview of gas turbine engine operation includes the compression of air to a high pressure high temperature condition in a compressor, injection and combustion of fuel with the compressed air and the expansion of the products of combustion through a turbine section which extracts a substantial amount of the energy present in the products of combustion. The turbine section powers the compressor section and in some instances also provides usable external mechanical power.

In large gas turbine engines the compressor section and turbine sections are of axial flow design and each stage comprises a disk having plurality of airfoils mounted on its rim. The blades and the disk move, the disk being mounted on a rotating shaft, and the disk blade assemblies are subject to very severe environments.

Historically blade and disk assemblies have been produced from separate components wherein a disk has the blades mechanically attached thereto. While this advantageously permits blade and disk to be of different materials, it adds substantially to the weight of the assembly relative to a unitary, integrally bladed rotor assembly.

The increases in the performance requirements for gas turbine engines, particularly military gas turbine engines, are leading to the introduction of integrally bladed rotors, wherein the blades are an integral part of the rotor and are either formed integrally with the disk or are metallurgically bonded to the disk. This reduces the weight deficit attributable to the prior art mechanical joining schemes.

A disk and blade assembly might typically comprise a single disk with about 100 blades attached thereto. In the prior art method of assembly employing mechanical joining techniques, it was relatively easy and straight forward to replace damaged blades simply by removing the damaged blade and replacing it with an identical undamaged blade. In the new environment of integrally bladed rotors, such repairs are far from simple. In the compressor and turbine sections of gas turbine engines, the blades and disks are operated at the outer limits of their property capabilities both in terms of stress and temperature. This means that any repair technique must produce repairs which have the strength of the parent metal, usually the blade material.

The need for repairs can arise both in service and in the initial fabrication of disk and blade assemblies. In service it is obvious that damage can arise from a variety of sources and also during the course of fabrication, the odds are fairly good that a statistically significant number of blades will have some defect.

There is also a need for a method to initially fabricate integrally bladed rotors by bonding individual blades onto a disk. Consequently, it is an object of the invention to repair or fabricate integrally bladed rotors.

Current blade bonding devices being developed address the bonding of the blades on a single integrally bladed rotor stage only. They use the philosophy of fixturing the rotor to a rigid frame, usually located on a mandrel which mates with the disk bore. The forces applied to the new blade being bonded are transmitted through the rig frame to the disk bore during the bond cycle. Although the forces are usually manageable (1,000 to 100,000 lbs.), an opportunity for elastic deflection of the frame and possibly the integrally bladed rotor itself exists, contributing to dimensional variances in the process.

SUMMARY OF THE INVENTION

The blade bonding device permits individual blades to be bonded to a blade stub or "standup" for the purpose of replacing a damaged or deviate blade. It is particularly useful on multistage drum rotor assemblies where the drum rotor is finished machined and a blade has been damaged by either a manufacturing error, handling error, or damaged from in-service use.

The device includes a clamp frame which carries a hydraulic ram. A blade holder arranged in contact with the axially moveable ram shaft is guided by a precision slot and pin arrangement from the frame. The clamp engages the inner surfaces of the rim of the rotor disk, and has a cooling passage through this location near the rim.

The need for a large rigid frame in which the entire drum rotor would be located has been eliminated. The bonding device can be hand held or easily manipulated by a mechanical device during installation because of its compact size. A bonding device for each unique rotor stage is fabricated eliminating the need to change blade tool holders.

All of the bonding forces are kept at the disk rim which is directly supported by the clamp frame. No forces are transferred through the disk or drum. The local fluid cooling passages in the clamp frame helps to isolate the high temperature to the bond zone, thereby avoiding thermal distortions of the rotor and minimizing the possibility of distortion under load because of the rotor portions entering the creep range during the bonding operation. Precise locating is accomplished in the immediate region of the blade being bonded, instead of locating on the border region of the drum rotor, then transferring that precision through large frame structure. The drum rotor can remain on its transport fixture while this device is clamped to a stage, thus eliminating an additional handling operation of a bladed drum. Blades can be bonded to the rotor at different stage locations during one vacuum pump down.

DESCRIPTION OF THE PREFERRED EMBODIMENT

Figure 2:
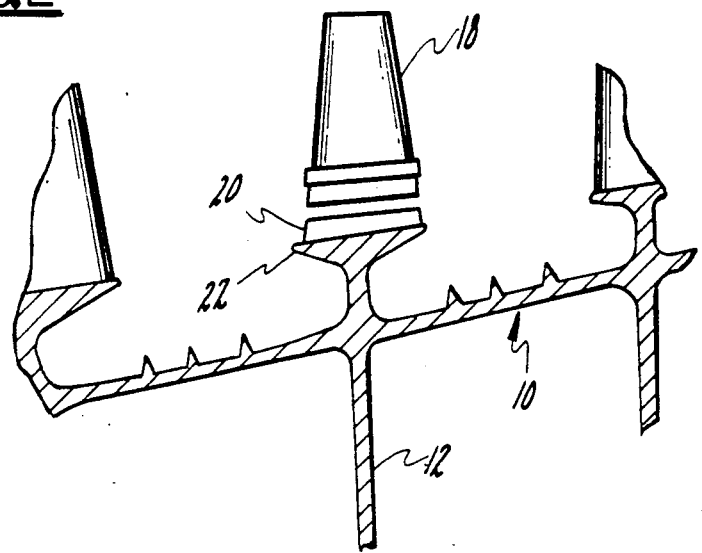
FIG. 2 is a detail in the rim and blade area of a disk.
Figure 1:
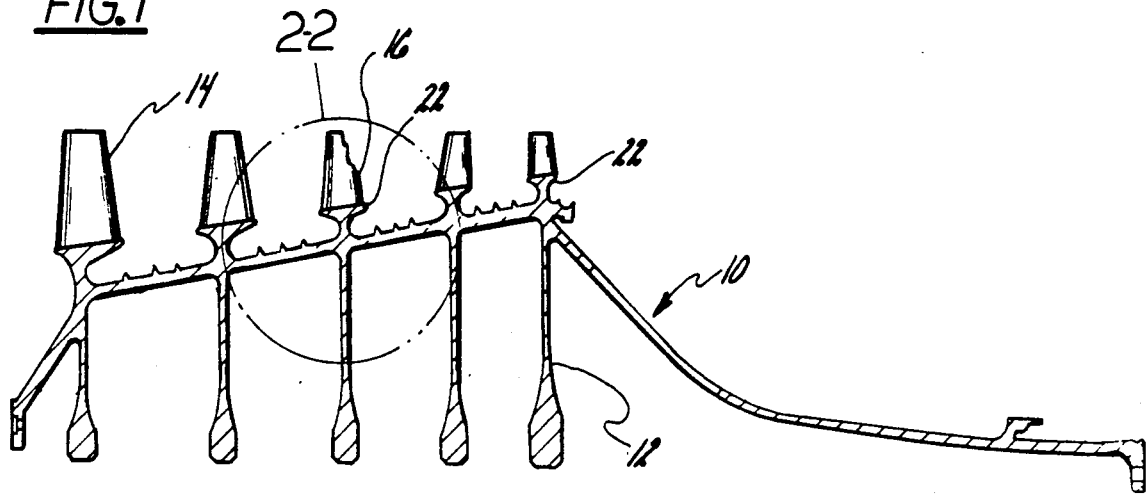
FIG. 1 illustrates a drum rotor being repaired.

FIG. 1 illustrates the drum rotor 10 including a plurality of disks 12. This disk carries a plurality of stages each formed of a plurality of blades 14. Blade 16 is shown as damaged and therefore the blade to be replaced. FIG. 2 illustrates a replacement blade 18 illustrated spaced from a blade stub 20 on disk rim 22.

Details including temperatures and typical metallurgy of the bonding process are described in U.S. Pat.

No. 4,873,751, which is incorporated herein by reference.

Figure 3:
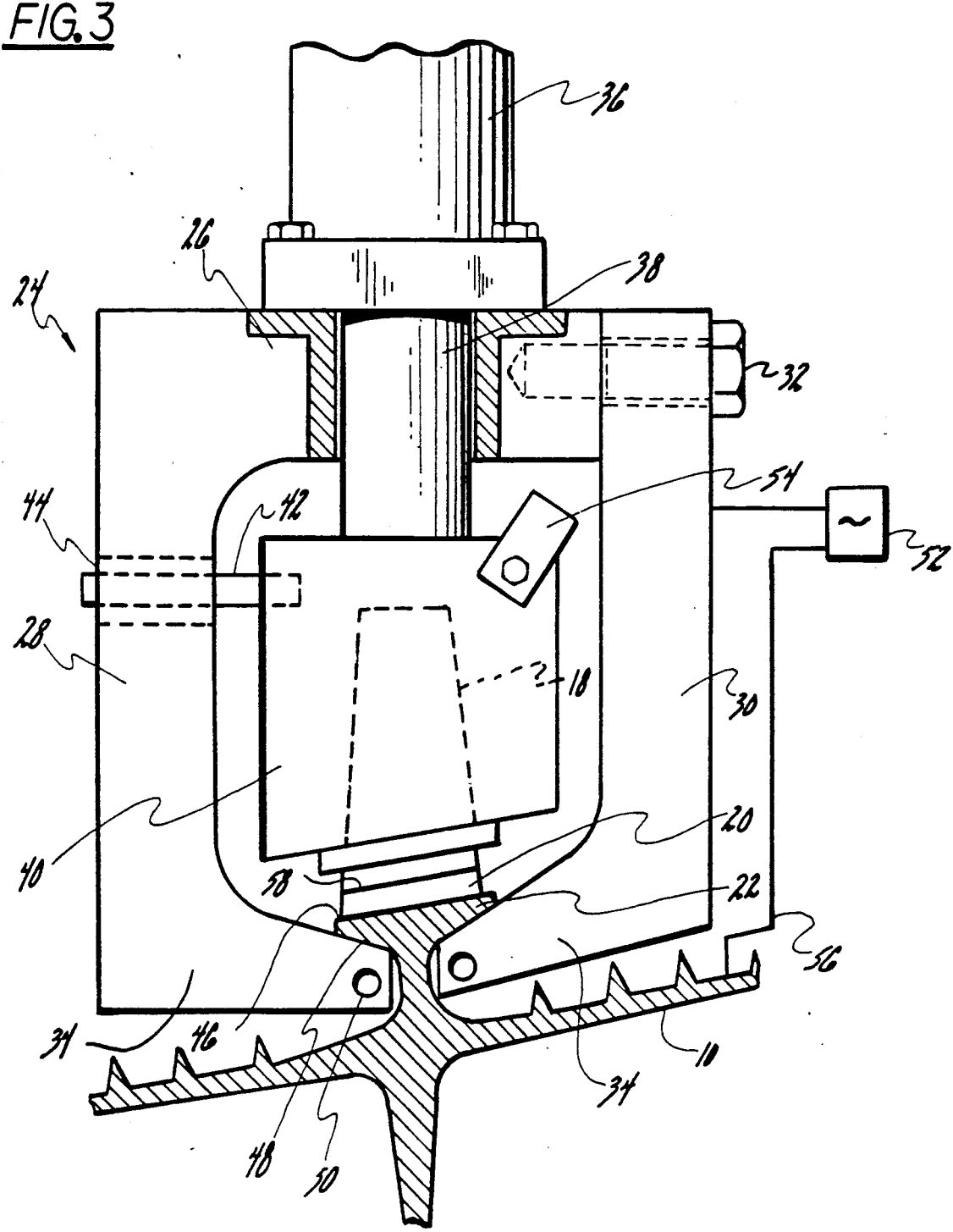
FIG. 3 shows the blade bonding device in operation.

FIG. 3 illustrates the blade bonding device 24 which includes a horizontally extending top member 26. A vertically extending first side member 28 is integral with the top member 26 and therefore maintains a rigid and consistent relationship therewith. A vertically extending second side member 30 is moveably secured to the top member by bolt 32. This permits the horizontally extending fingers 34 at the bottom of each side member to be opened and closed underneath rim 22.

A hydraulic ram 36 is rigidly secured to the top member 26 and has a longitudinally extensible ram shaft 38 secured thereto.

A blade holder 40 is in contact with the ram shaft and carries blade 18 which is to be bonded to stub 20. A guidance arrangement comprising pin 42 on the blade holder passes through a precision machined slot 44 in vertical leg 28, to provide precise alignment between the blade holder at the frame.

The upper surface 46 of each finger is configured to mate accurately with the underside 48 of rim 22. Water coolant passages 50 are located adjacent to this surface to provide local cooling and minimize heat transferred to the disk and rotor.

One heating means for heating the interface between the blade and the stub 20 is shown in the form of an electric source 52 connected through clamp 54 to the blade holder. There also is included a line 56 connected to the rotor. Heat is generated at the interface 58 produced by the power passing through the circuit. Other heating means such as induction heating may be used.

In operation, the rotor with a bonding device, a new blade for one or more locations installed, is placed within a vacuum chamber. The vacuum is pumped down, and the proper heat applied to the interface. Hydraulic ram 36 presses the blade into contact at a sufficient pressure for a sufficient time to effectuate the bonding.

What is claimed is:

1. A blade repair apparatus for replacing a blade on an integrally bladed rotor having an axially extending rim to which blades are secured, comprising:
   a clamp frame including a horizontally extending top member, a vertically extending first side member integral with said top member, a vertically extending side member moveably secured to said top member, and a horizontally extending finger at the bottom of each side member having a mating upper surface configured to mate with the underside of said rim;
   a hydraulic ram rigidly secured to said top member and having a longitudinally moveable ram shaft;
   a blade holder secured to said ram shaft;
   a precision guidance arrangement between said first side member and said blade member; and
   heating means for heating the interface between a blade and said blade holder and a blade stub on said rim.

2. A blade repair apparatus as in claim 1, further comprising:
   fluid coolant passages in each of said fingers at a location adjacent said mating upper surface.

3. A blade repair apparatus as in claim 2:
   said guidance arrangement comprising
   a pin and slot arrangement between said first side member and said blade member.

4. A blade repair apparatus as in claim 1:
   said guidance arrangement comprising
   a pin and slot arrangement between said first side member and said blade member.

* * * * *